United States Patent Office 3,494,774
Patented Feb. 10, 1970

3,494,774
FRICTION MATERIAL
Horace A. Bray, Stoke, Coventry, England
(% Fort Dunlop, Erdington, Birmingham 24, England)
No Drawing. Continuation of application Ser. No. 615,265, Feb. 10, 1967, which is a continuation of application Ser. No. 301,888, Aug. 13, 1963. This application Sept. 16, 1968, Ser. No. 762,365
Claims priority, application Great Britain, Aug. 16, 1962, 31,413/62
Int. Cl. C09k 3/14
U.S. Cl. 106—36
8 Claims

ABSTRACT OF THE DISCLOSURE

A molded friction pad for brakes and clutches formed for example by sintering under pressure a mixture including 1% to 70% by weight of silicon nitride together with one or more of the following materials: iron, copper, nickel, cobalt, manganese. The pad also may contain carbon, molybdenum disulphide, a metal phosphide, certain borides and other materials in amounts between 1% and 25% by weight of the pad. A method of molding such a friction pad includes nitriding a porous body of silicon and thereafter impregnating it with friction modifiers such as iron, copper or other specified materials.

---

This application is a continuation of my prior application Ser. No. 615,265, filed Feb. 10, 1967, which in turn is a continuation of my prior application Ser. No. 301,888, filed Aug. 13, 1963, both now abandoned.

This invention relates to friction materials and friction elements made therefrom, and to methods of manufacturing friction materials and friction elements.

The object of the invention is to provide an improved friction material for friction elements, such as brake or clutch linings or friction pads, with or without backing plates or shoes, for use in high energy dissipating mechanisms such as aircraft brakes, tractor and earthmover brokes, steering clutches, etc.

According to the invention, a friction material comprises silicon nitride.

Preferably, the friction material in accordance with the invention comprises silicon nitride as its main friction producing ingredient, the silicon nitride being dispersed in a suitable metal matrix together with other materials which act as friction-modifying or wear-modifying ingredients.

The silicon nitride may be in the form of a powder. The powder may comprise agglomerates, that is, particles containing silicon nitride which are larger in size than that normally obtained in the production of silicon nitride. The agglomerates may be entirely of silicon nitride, or they may be produced by bonding together smaller silicon nitride particles using other materials as binding agents. Alternatively, the agglomerates may be produced by nitriding silicon in the presence of other materials which act as fillers, the silicon nitride bonding together the filler particles.

The invention also provides a method of manufacturing friction material comprising mixing silicon nitride in powder form, which may comprise agglomerates, with a suitable matrix metal also in powder form, and sintering the mixture in a non-oxidizing atmosphere. The silicon nitride may alternatively be mixed in powder form with suitable friction modifying ingredients, the mixture then being hot pressed to bond together the silicon nitride and other ingredients, the silicon nitride forming a matrix.

Another alternative method in accordance with the invention comprises mixing silicon in powder form with a suitable matrix metal also in powder form, and sintering the mixture in a nitrogen or ammonia atmosphere.

A further alternative method in accordance with the invention comprises producing a porous body of silicon, nitriding the body to form a porous body of silicon nitride, and then impregnating the body with suitable friction modifiers.

The invention also provides a brake or clutch incorporating a friction element comprising a friction material as defined above.

Silicon nitride $Si_3N_4$ is a very hard material having a hardness of about 9 on Mohs' scale and has heretofore been proposed as a refractory material on account of its resistance to temperature and oxidation, and its high resistance to thermal shock. It is usually made by reacting silicon powder with a nitrogenous atmosphere at temperatures from about 1150° C. to 1450° C. In order to keep the time of reaction to a minimum, the silicon is used in the form of very fine powder so that the silicon nitride so formed is also in the form of a very fine powder. The actual methods of producing silicon nitride are well known in the art and, except where the manufacture of a friction material requires a particular method—such as the nitriding of silicon "in situ," do not form part of this specification.

One preferred method of manufacturing the friction material according to the invention is that in which silicon nitride is mixed in powder form with a suitable metal binder, the resulting mixture being pressed at a pressure of the order of 3–50 tons per square inch. The briquette so formed is then sintered in a reducing or non-oxidising atmosphere at a temperature sufficient to sinter the metal binder to form it into a matrix. Re-pressing or "coining" can be carried out subsequently in order to densify the material.

The method described in the preceding paragraph is that which was used in the preparation of the specific examples of friction materials which are given later in the specification. It should be noted however that instead of a metal matrix it is also possible to use a suitable organic or inorganic resin, for example, an organic thermosetting resin of the phenol formaldehyde type or a resin in the form of an inorganic polymer, or mixtures thereof, the silicon nitride being incorporated in the resin matrix by any well known method.

The powdered silicon nitride will usually be present in the proportion of up to about 70% by weight but the exact proportion will be dependent upon the strength of the remaining ingredients and will be chosen so as to give the maximum strength consistent with the degree of wear resistance and friction coefficient required.

When the matrix consists of metals, the metals will normally be chosen from the group consisting of iron, copper, nickel, cobalt, manganese or mixtures of these. Additions of tin, zinc, lead, bismuth, and/or antimony may be made to modify the matrix and may constitute up to about 40% by weight of the matrix. Modifying agents may also be added to impart some specific wear or friction modifying action to the whole material. Modifying agents used are graphite, molybdenum disulphide, cuprous sulphide, the borides of carbon, manganese and titanium, silica, aluminum orthophosphate, magnesium pyrophosphate, manganese pyrophosphate and/or inorganic fibrous materials. The friction and wear modifiers when present will comprise between about 1% and about 25% by weight of material.

It has been stated that when the silicon nitride is produced by nitriding silicon, the powder so formed is very fine and whilst the very fine powdered form will give satisfactory results, the shear strength of the material can be improved considerably by increasing the particle size of the silicon nitride by some form of aggregation to form agglomerates. Simple granulating, or slugging and granulating, can be carried out in order to increase the particle size to a size which will pass through a British Standard 20-mesh sieve but will be retained by a 100-mesh sieve (the wires of a 20-mesh sieve are separated by a 0.03 inch clearance, those of a 100-mesh sieve by 0.006 inch). This size of particle is to be preferred to the finer sizes because for a given weight percentage of the nitride it provides a lower volume percentage of the nitride with a consequent increase in volume percentage of the matrix and therefore gives a higher shear strength and resistance to wear.

The particle size may also be increased by bonding the silicon nitride with various materials, granulating and firing to a suitable temperature. Another method is to mix suitable materials with silicon and heat in a nitrogenous atmosphere to form particles bonded by silicon nitride. Yet another method is to produce large particles of self bonded silicon nitride either by hot pressing or by nitriding large blocks of pressed or slip-cast silicon, and then grinding the large blocks of dense silicon nitride thus formed to produce particles of the preferred size. Ground scrap silicon nitride crucibles, etc. may also be used.

When the aggregation of particles is to be carried out by means of bonding with other materials, the materials must be so chosen as not to detract from the friction and wear properties of the silicon nitride itself. One such material is carbon, and the silicon nitride can be mixed with such binder materials before firing as will produce graphite or other forms of carbon after firing. Examples of such binders are sugar, dextrin, carboxy methyl cellulose, pitch, coal tar and various organic liquids. A second group of binders which in fact enhance the wear-resistance and/or friction coefficient of the silicon nitride consists of the refractory materials, silica, alumina, cordierite, petalite, the orthophosphate of aluminum, and the pyrophosphates of manganese, and magnesium.

The particular methods of manufacture employed in producing silicon nitride can also be used in increasing the size of the particles. Thus fine silicon can be mixed with suitable filler materials, and, provided the melting points of such materials are higher than that of the silicon, the silicon can be nitrided "in situ" thus itself forming a binding agent for the filler materials. Suitable materials are found in the group aluminum orthophosphate, graphite, other forms of carbon, silica, alumina, zirconia, thoria, strontia, and the borides of carbon, manganese, and titanium.

The shear strength of the material can be improved by coating the silicon nitride, or the bonded silicon nitride agglomerates, with a metal such as copper, nickel, cobalt or iron by means of chemical reduction or other well known processes. This method provides a degree of sintering between the metal coating on the nitride and the metal or metals used in the matrix. Choice of the coating will be determined by the reaction between such coating and the matrix.

It is intended that the materials according to the invention shall be used in any way currently known to those skilled in the art, e.g. they may be rivetted onto a suitable backing plate, which is then used as a stator or rotor, or sintered onto a backing plate which is then rivetted or otherwise fixed in a cup or other suitable container after sintering, the container then being fixed to a rotor or stator.

Examples A-J of friction materials in accordance with the invention, using a metal matrix, are given below, these examples showing the range of variation of the proportions of the ingredients.

EXAMPLE A

| | Percent |
|---|---|
| Copper+nickel | 10–99 |
| Tin | 0–7 |
| Graphite | 1–25 |
| Silicon nitride | 1–70 |

EXAMPLE B

| | Percent |
|---|---|
| Iron | 10–99 |
| Tin | 0–7 |
| Graphite | 0–25 |
| Silicon nitride | 1–70 |

EXAMPLE C

| | Percent |
|---|---|
| Iron | 10–99 |
| Tin | 1–7 |
| Graphite | 0–25 |
| Silicon nitride | 1–70 |
| Cuprous sulphide | 0–25 |

EXAMPLE D

| | Percent |
|---|---|
| Nickel+copper | 10–99 |
| Tin | 0–7 |
| Graphite | 0–25 |
| Silicon nitride | 1–70 |
| Manganese boride | 0–25 |

EXAMPLE E

| | Percent |
|---|---|
| Copper+iron | 10–90 |
| Tin | 1–40 |
| Graphite | 0–25 |
| Silicon nitride | 1–70 |

EXAMPLE F

| | Percent |
|---|---|
| Nickel+copper | 10–99 |
| Tin | 0–7 |
| Graphite | 0–25 |
| Aluminum orthophosphate bonded with silicon nitride | 1–70 |

EXAMPLE G

| | Percent |
|---|---|
| Nickel+copper+iron | 10–99 |
| Tin | 1–40 |
| Graphite | 0–25 |
| Silicon nitride | 1–70 |

EXAMPLE H

| | Percent |
|---|---|
| Copper+nickel | 10–99 |
| Tin | 0–7 |
| Graphite | 0–25 |
| Silicon nitride bonded with sugar | 1–70 |

EXAMPLE J

| | Percent |
|---|---|
| Copper+nickel | 10–99 |
| Tin | 0–7 |
| Graphite | 0–25 |
| Manganese pyrophosphate bonded with silicon nitride | 1–70 |

In all of these examples the powdered materials are simply mixed in such proportions as are required to give the most desirable composition for the particular use to which the materials are to be put, pressed at pressures up to 50 tons per square inch and sintered in non-oxidising atmospheres.

Specific examples of friction materials made in accordance with the above examples were compacted in the proportions shown in the table which follows.

TABLE I

| Example | Percent by weight | | | | | |
|---|---|---|---|---|---|---|
| | 1 | 2 | 3 | 4 | 5 | 6 |
| Copper | 45 | | 45 | 45 | 45 | 43.3 |
| Nickel | 25.5 | | 25.5 | | 25.5 | 24.5 |
| Iron | | 71.7 | | 20 | | |
| Tin | 1.5 | 2.4 | 1.5 | 5 | 1.5 | 1.4 |
| Graphite | 14 | 11 | 14 | 10 | 14 | 13.5 |
| Cuprous Sulphide | | 3.9 | | | | |
| Silicon Nitride | 14 | 11 | | | | 13.5 |
| Silicon Nitride bonded aluminium orthophosphate (the silicon nitride acting as the bonding agent for the aluminium orthophosphate) | | | 14 | | | |
| Silicon Nitride bonded with sugar | | | | | 14 | |
| Manganese Boride | | | | | | 3.8 |
| Silicon Nitride bonded with manganese pyrophosphate | | | | 20 | | |

It will be apparent from the foregoing specific examples that in one range of embodiments of the invention, silicon nitride is present in effective amounts up to 20% by weight of the friction material.

These compositions were sintered, after compacting at 20 tons per square inch, in an exothermic atmosphere at 980° C., except for Example 4 which was sintered at 800° C.

They were then tested in an inertia wheel dynamometer under similar conditions to those described in our U.K. patent specification No. 864,796, except that after 15 stops under the first set of conditions three more onerous conditions were then imposed. These conditions may be summarised as follows:

TABLE II

| | Conditions | | | |
|---|---|---|---|---|
| | 1 | 2 | 3 | 4 |
| Number of stops | 15 | 5 | 5 | 5 |
| Energy absorbed per stop (foot pounds) | 250,000 | 365,000 | 365,000 | 365,000 |
| Pressure per sq. in. of pad (pounds) | 150 | 150 | 225 | 300 |

The materials were measured before and after the tests. The stopping times recorded in Table III are a measure of the friction coefficient, the greater the stopping time the lower the friction value wherein 1–6, inclusive correspond respectively to Examples 1–6 inclusive, of Table I.

TABLE III

| Condition | Stop Number | Stopping time (seconds) | | | | | |
|---|---|---|---|---|---|---|---|
| | | Ex. 1 | Ex. 2 | Ex. 3 | Ex. 4 | Ex. 5 | Ex. 6 |
| 1 | 2 | 14.0 | 17.1 | 12.7 | 13.8 | 14.8 | 15.8 |
| | 5 | 13.6 | 18.5 | 12.2 | 13.2 | 14.8 | 12.6 |
| | 10 | 17.7 | 23.0 | 13.0 | 13.6 | 16.0 | 12.3 |
| | 15 | 14.8 | 23.5 | 15.8 | 17.6 | 16.0 | 13.1 |
| 2 | 16 | 20.5 | 25.0 | 19.0 | 20.2 | 20.3 | 15.6 |
| | 20 | 19.6 | 25.5 | 18.6 | 20.0 | 20.3 | 16.2 |
| 3 | 21 | 15.0 | 18.1 | 14.3 | 14.1 | 15.0 | 12.1 |
| | 25 | 16.2 | 18.4 | 12.7 | 13.9 | 14.8 | 12.4 |
| 4 | 26 | 12.9 | 13.8 | 10.1 | 10.6 | 10.6 | 9.7 |
| | 30 | 11.9 | 12.3 | 10.5 | 10.4 | 10.6 | 10.4 |
| Total Wear (inch) | | .029 | .025 | .030 | .040 | .043 | .025 |

The slightly higher wear rate recorded for Examples 3, 4 and 5, which is in contrast to the lower wear rate which is to be expected from the use of a larger particle size of silicon nitride, can be accounted for by the increased energy absorption by the material during the test, owing to the higher friction coefficient of this material produced by the agglomeration process.

The ability of the material according to the invention to withstand high loading conditions and to provide a good coefficient of friction under such operating conditions is shown by the following example: On an aircraft brake designed to absorb $5.16 \times 10^6$ foot pounds normally and to absorb $8.3 \times 10^6$ foot pounds during a rejected take off (emergency) stop using the best materials previously known, a test was carried out using the material of Example 1. Two stops were carried out, one at $10.7 \times 10^6$ foot pounds and one at $12.0 \times 10^6$ foot pounds after satisfactorily completing the normal test schedule.

Both of these stops were satisfactorily completed, giving coefficients friction higher than those obtained with the known friction material which previously had given the best results.

Whilst one specific embodiment of the invention has been described in detail it will be obvious that since the silicon nitride is the essential part of these materials, then any other method of manufacture which produces as a final product a material comprising silicon nitride may be employed. Thus the silicon nitride may be produced "in situ" by mixing silicon with the other materials and nitriding to convert the silicon to silicon nitride. Care must be taken in this method to use only those materials which do not adversely react with or detract from the nitriding process.

It will be seen that the silicon nitride can be used both as a primary friction-producing ingredient bonded with a suitable material or a matrix for other friction-producing materials or friction or wear modifiers, the matrix itself then acting as the primary friction-producing ingredient. Where the silicon nitride is used at a matrix and formed "in situ" silicon is mixed with metals and nonmetals having melting points higher than the temperature at which nitriding of the silicon is carried out, but since this can be between about 1150° C. and 1500° C. these materials would include iron, nickel, cobalt, molybdenum, tungsten, monel and mixtures of these, together with carbon and/or other materials likely to lubricate the materials at low rubbing speeds.

When the material is made as a porous body it can of course be impregnated with materials chosen to impart some wear or friction modifying action such as organic or inorganic resins, or metals or metalloids, e.g. ferro-alloys such as ferrophosphorous or ferrosilicon.

Having now described my invention, what I claim is:

1. A molded friction pad for brakes and clutches which comprises in sintered form a matrix constituent and a particulate constituent of fine particles dispersed in said matrix constituent, one of said constituents being silicon nitride and the other being a friction modifying constituent, said silicon nitride comprising from 1% by weight to 70% by weight of said friction pad and said friction modifying constituent comprising at least one member of the group consisting of iron, copper, nickel, cobalt and manganese.

2. The molded friction pad of claim 1 in which the particulate constituent comprises silicon nitride.

3. The molded friction pad of claim 1 in which the matrix constituent comprises silicon nitride.

4. The molded friction pad as claimed in claim 1, wherein up to about 40% by weight of said friction modifying constituent comprises at least one member of the group consisting of tin, zinc, lead, bismuth and antimony.

5. The molded friction pad of claim 1 including as a modifying agent at least one member of the group consisting of carbon, molybdenum disulphide, on cuprous sulphide, the borides of carbon, manganese and titanium, silica, aluminum orthophosphate, magnesium pyrophosphate and manganese pyrophosphate in an amount of about 1% to about 25% by weight of the pad.

6. The molded friction pad of claim 1 wherein said silicon nitride is present in an amount up to 20% by weight of the pad.

7. A molded friction pad for brakes and clutches which comprises a matrix constituent and a constituent of particles enclosed in and bonded by said matrix in which one of said constituents comprises silicon nitride and the other constituent consists essentially of at least one metal of the group consisting of iron, copper, nickel, cobalt and manganese, and from 0 to 40% of at least one member of the group consisting of tin, zinc, lead, bismuth, and antimony, said pad further comprising between about 1% and about 25% by weight of at least one member of the group consisting of carbon, molybdenum disulphide, cuprous sulphide, carbon boride, manganese boride, titanium boride, silica, aluminum orthophosphate, magnesium pyrophosphate, and manganese pyrophosphate, said pad containing from 1% to 70% by weight of silicon nitride.

8. The molded friction pad of claim 7 wherein said silicon nitride is present in an effective amount of up to 20% by weight of the pad.

References Cited

UNITED STATES PATENTS

| | | | |
|---|---|---|---|
| 3,002,936 | 10/1961 | Allenbach et al. | 252—518 |
| 3,014,884 | 12/1961 | Bray | 260—38 |
| 3,085,886 | 4/1963 | Grandy | 106—41 |
| 3,244,480 | 4/1966 | Johnson et al. | 23—191 |

FOREIGN PATENTS 806,414  2/1956  Great Britain.

JULIUS FROME, Primary Examiner

U.S. Cl. X.R.

106—286